(12) United States Patent
Amirpour et al.

(10) Patent No.: US 11,936,864 B2
(45) Date of Patent: Mar. 19, 2024

(54) FAST MULTI-RATE ENCODING FOR ADAPTIVE STREAMING USING MACHINE LEARNING

(71) Applicant: BITMOVIN, INC., San Francisco, CA (US)

(72) Inventors: Hadi Amirpour, Klagenfurt am Wörthersee (AT); Ekrem Çetinkaya, Klagenfurt am Wörthersee (AT); Christian Timmerer, Klagenfurt am Wörthersee (AT)

(73) Assignee: BITMOVIN, INC., San Francisco, CA (US)

( * ) Notice: Subject to any disclaimer, the term of this patent is extended or adjusted under 35 U.S.C. 154(b) by 0 days.

(21) Appl. No.: 17/540,643

(22) Filed: Dec. 2, 2021

(65) Prior Publication Data

US 2022/0094928 A1 Mar. 24, 2022

Related U.S. Application Data

(63) Continuation-in-part of application No. 17/090,802, filed on Nov. 5, 2020, now Pat. No. 11,546,401.
(Continued)

(51) Int. Cl.
*H04N 19/12* (2014.01)
*G06N 3/04* (2023.01)
(Continued)

(52) U.S. Cl.
CPC .............. *H04N 19/12* (2014.11); *G06N 3/04* (2013.01); *H04N 19/136* (2014.11); *H04N 19/176* (2014.11); *H04N 19/436* (2014.11)

(58) Field of Classification Search
CPC .... H04N 19/12; H04N 19/136; H04N 19/176; H04N 19/436; G06N 3/04
See application file for complete search history.

(56) References Cited

U.S. PATENT DOCUMENTS 10,708,331 B1 7/2020 Joliveau et al.
2006/0239343 A1 10/2006 Mohsenian
(Continued)

FOREIGN PATENT DOCUMENTS

EP 3529989 A1 8/2019
WO 2013068567 A1 5/2013
WO 2014190308 A1 11/2014

OTHER PUBLICATIONS

Li Zhu, CN 110717366 A (English Translation), Jul. 13, 2018, pp. 1-59 (Year: 2018).*
(Continued)

*Primary Examiner* — Jonathan A Bui
(74) *Attorney, Agent, or Firm* — Marton Ribera Schumann & Chang LLP; Chien-Ju Alice Chuang; Hector J. Ribera

(57) ABSTRACT

According to embodiments of the disclosure, fast multi-rate encoding may be performed using machine learning by encoding a lowest quality representation to determine encoding parameters, processing raw data of the video using a neural network to obtain an intermediate output comprising encoding features, augmenting the intermediate output with additional encoding features to form a final tensor, and processing the final tensor with another neural network to obtain a classification output comprising a split or not split decision for an image data block. The classification output may be used to encode a highest quality representation, and then other representations of the video.

20 Claims, 12 Drawing Sheets

Related U.S. Application Data

(60) Provisional application No. 63/121,502, filed on Dec. 4, 2020, provisional application No. 62/932,417, filed on Nov. 7, 2019.

(51) Int. Cl.
*H04N 19/136* (2014.01)
*H04N 19/176* (2014.01)
*H04N 19/436* (2014.01)

(56) References Cited

U.S. PATENT DOCUMENTS

| | | | |
|---|---|---|---|
| 2011/0305273 A1 | 12/2011 | He et al. | |
| 2015/0030071 A1 | 1/2015 | Heng | |
| 2016/0205407 A1 | 7/2016 | Carmel et al. | |
| 2020/0410337 A1* | 12/2020 | Huang | G06N 3/045 |
| 2021/0099739 A1 | 4/2021 | Weil et al. | |
| 2022/0237430 A1* | 7/2022 | Chao | G06V 10/421 |

OTHER PUBLICATIONS

Schroeder et al., "Efficient Multi-Rate Video Encoding for HEVC-Based Adaptive HTTP Streaming", IEEE, vol. 28, No. 1, Aug. 10, 2016, pp. 143-157.

Guo et al., "Fast Block Structure Determination in AV1-based Multiple Resolutions Video Encoding", arxiv.org, pp. 1-7.

International Application No. PCT/EP2020/059448, Invitation to Pay Additional Fees dated Mar. 15, 2021 12 pages.

De Praeter et al., "Fast Simultaneous Video Encoder for Adaptive Streaming", 2015 IEEE 17th International Workshop, Oct. 19, 2015, pp. 1-6.

Kim Kyungah Al., "Fast CU Depth Decision for HEVC Using Neural Networks", IEEE Transactions on Circuits and Systems for Video Technology, vol. 29, No. 5, May 1, 2019, pp. 1462-1473.

International Application No. PCT/US2021/061678, International Search Report and Written Opinion dated Mar. 3, 2022 9 pages.

Goswami Kalyan et al., "Adaptive Multi-Resolution Encoding for ABR Streaming", 2018 25th IEEE International Conference on Image Processing (ICIP), Oct. 7, 2018, pp. 1008-1012.

* cited by examiner

FAST MULTI-RATE ENCODING FOR ADAPTIVE STREAMING USING MACHINE LEARNING

CROSS-REFERENCE TO RELATED APPLICATIONS

The present application is a continuation-in-part of U.S. patent application Ser. No. 17/090,802 titled "Fast Multi-Rate Encoding for Adaptive HTTP Streaming," filed Nov. 5, 2020, which claims the benefit of U.S. Provisional Patent Application No. 62/932,417, filed Nov. 7, 2019, and claims the benefit of U.S. Provisional Patent Application No. 63/121,502, filed Dec. 4, 2020, all of which are incorporated herein by reference in their entirety.

BACKGROUND

This disclosure generally relates to encoding of video or other media, and more particularly to the encoding of video titles using a customized multi-pass approach.

Due to the increasing availability of mobile high-speed Internet connections like WLAN/3G/4G/5G and the huge smartphone and tablet device boom in the recent years, mobile video streaming has become an important aspect of modern life. Online video portals like YouTube or Netflix deploy progressive download or adaptive video on demand systems and count millions of users watching their content every day. Real-time entertainment produces already nearly 50% of the U.S. peak traffic nowadays. This volume is expected to increase as the distribution of content worldwide moves to streaming platforms and stream size increases with additional audio-visual quality features, e.g., HDR, Atmos, etc., and with higher and higher resolutions, transitioning from 1080p to 4K, 8K, and future developed resolution standards. Moreover, particularly for mobile environments, adaptive streaming is required to cope with the considerable high fluctuations in available bandwidth. The video stream has to adapt to the varying bandwidth capabilities in order to deliver the user a continuous video stream without stalls at the best possible quality for the moment, which is achieved, for example, by dynamic adaptive streaming over HTTP.

In this context, adaptive streaming technologies, such as the ISO/IEC MPEG standard Dynamic Adaptive Streaming over HTTP (DASH), Microsoft's Smooth Streaming, Adobe's HTTP Dynamic Streaming, and Apple Inc.'s HTTP Live Streaming, have received a lot of attention in the past few years. These streaming technologies require the generation of content of multiple encoding bitrates and varying quality into different "representations" to enable the dynamic switching between different representations of a title with different bandwidth requirements to adapt to changing conditions in the network. For example, FIG. 1 illustrates various representations of a "Cactus" sequence encoded at different resolutions and qualities. The raw video 100 is encoded at various resolutions, including 8K, 4K, 1080p, 720p, and 360p (by way of example), to produce different resolution video sequences 101. At each resolution, the same sequence is also encoded at different qualities 102 with different quantization parameters (QP). Quality level can be controlled by the QP in the encoder and a lower QP value results in a better visual quality, for example QP22 has a higher quality than QP36. For illustration, a blow up of a tile for the 1080p encoded sequence is shown at QP22 103a and at QP36 103b. Hence, it is important to provide easy content generation tools to developers to enable the user to encode and multiplex content in segmented and continuous file structures of differing qualities with the associated manifest files.

Existing encoder approaches allow users to quickly and efficiently generate content at multiple quality levels suitable for adapting streaming approaches. For example, a content generation tool for MPEG-DASH video on demand content has been developed by Bitmovin, Inc. (San Francisco, California), and it allows users to generate content for a given video title without the need to encode and multiplex each quality level of the final DASH content separately. The encoder generates the desired representations (quality/bitrate levels), such as in fragmented MP4 files, and MPD file, based on a given configuration, such as for example via a RESTful API. Given the set of parameters the user has a wide range of possibilities for the content generation, including the variation of the segment size, bitrate, resolution, encoding settings, URL, etc. Using batch processing, multiple encodings can be automatically performed to produce a final DASH source fully automatically.

MPEG-DASH videos are divided into segments and each segment is encoded at different rates and resolutions into what are called representations. The representations are stored on an HTTP server accessible by streaming clients via a network, like the Internet. A streaming client, based on current network conditions, can adaptively select the appropriate representation for each segment. With emergence of devices capable of reproducing video content at different resolutions, and the wide availability of high-resolution displays, the required number of representations for a given title is increasing. This can strain the storage demands put on servers that make video content available over the network. Thus, compression of multiple representations to be stored in the server needs a highly efficient video encoder.

Nowadays, video encoders using newer encoding protocols, like High Efficiency Video Coding (HEVC), Versatile Video Coding (VVC), etc., provide higher efficiency than encoders using previous standards, like H.264/AVC, which can typically require using more tools at the cost of encoding time-complexity. The time-complexity increase is more critical when encoding of the same video content into different representations is required, making it more challenging, especially for live DASH streaming content. Although these representations are encoded independently, they show high redundancy that can be used to predict decisions in the encoding process, consequently decreasing the encoding time-complexity.

The HEVC standard introduced the concept of Coding Tree Units (CTUs), an efficient and time complex tool to encode the frames of a video. In HEVC, frames are divided into tiles or slices which are further divided into CTUs with pre-determined size of up to 64×64 pixels. In VVC, these blocks are extended to up to 128×128 pixels. FIG. 2A illustrates an example CTU 200 for an HEVC encoded frame. Each CTU can be recursively divided into multiple equal-sized square regions called coding units (CUs) 201. Thus, the CTU can be divided into CUs 201a of a larger size than can then be divided into smaller size CUs 201b, which can also be divided into even smaller CUs 201c. In VVC, the CTUs can be also partitioned into different number of smaller CUs, including 3 equal size blocks, providing additional flexibility. As illustrated in FIG. 2B, each division of the CTU increases the depth of a CU by 1, e.g. in HEVC, 64×64 is depth 0 and 8×8 is depth 3. Each CU may be divided further into smaller blocks called Prediction Units (PUs), which allow multiple different irregular shapes to encode each CU according to two different prediction types, i.e., Intra and Inter modes. In Inter mode, to find the optimal motion vector, multi-reference motion estimation is used.

A large number of possible CTU partitioning schemes introduces a lot of complexity in the HEVC encoding process. But the proper treatment of the CTU provides the highest bitrate saving among the other tools at the cost of increased time-complexity. In an HEVC encoder, finding the optimal CU depth structure for a CTU can be done using a brute force "search" approach to find the structure with the least rate distortion (RD) cost, for example using a Lagragian multiplier. However, this approach takes the largest amount of time in the encoding process. High-motion areas of a CTU are usually given smaller CUs in HEVC. In addition, PU mode decision processing to find the optimal PU mode for each CU imposes additional time-complexity to efficiently encode a CTU. Besides CTU depth structure and PU mode decision, the search process to find optimal prediction type, reference frame and motion vector causes high computational complexity for an HEVC encoder.

Information of the previously encoded representation, i.e., the reference representation, can be used to speed up the encoding process of the remaining representations, i.e., the dependent representations, by eliminating unnecessary CU depth searches. Co-located CTUs, the CTU in the reference representation in the same spatial and temporal location, of a video encoded at different bit-rates show some similarities that are exploited in fast multi-rate encoding methods. Some existing approaches first encode the highest quality representation as the reference encoding using unmodified HEVC. Thereafter, the block structure of the each encoded CTU is used to predict the block structure of the current CTU in lower quality representations (dependent encoding). It is observed that the higher the quality is, the higher the depths of CTU partitions are. Based on this observation, CUs that have less depth than the co-located CU in the higher quality representation are skipped from the search leading to time-savings in the encoding process. Other approaches reuse block structure of reference encoding's CTUs in lower resolution representations. As CTUs in various resolutions are not matched, a matching algorithm is used to derive the block structure from a high resolution reference encoding. For example, such a prior approach is based on two previously explained algorithms which reuse the block structure of the reference encoding to skip searching higher depths in the lower quality and lower resolution representations.

In other prior approaches, a video segment is first encoded at the lowest resolution and then, features, such as motion vectors and CTU block structure, are exploited to limit search process for encoding the higher bit-rate representations. A scalable quality HEVC encoder has also been proposed based on CTUs. Three different ways were defined based on trade-off between coding efficiency and time-complexity reduction. These approaches use CU size of High Bit-rate (HBR) bit-stream as a lower bound in the Lower Bitrate (LBR) decisions. In the cases that higher time-complexity reduction is required, based on required bit-rate, searching the same size CU is skipped and just the lower depth CUs are searched.

In yet other prior approaches, motion estimation is only done for high bit-rate/reference representation and motion compensation is done in the discrete cosine transform (DCT) domain. These approaches eliminate the need for motion estimation for lower bit-rate representations. Alternatively, a machine learning method, e.g. Random Forest, may be used to predict the information that will be used for encoding remaining representations. The algorithm can use information of blocks in the fully encoded representation that are in the same location as current block to predict block structure of the current block. Features are chosen as blocks in variance of the transform coefficients, motion vector variance and information about block structure. Others have proposed a fast block structure determination method for AV1 encoders. The similarity of block structure between different resolutions is used to decide early termination in the Rate Distortion Optimization (RDO) process. This leads to accelerating encoding high-resolution representation reusing low-resolution encoding results. As reviewed above, these algorithms are mainly focused on skipping the searching of higher-depths in CTUs using instead information from higher-quality representations.

Considering the large number of representations that are typically needed for a given title, encoding time-complexity in multi-rate encoding systems is a significant challenge. Although existing methods reduce the time-complexity of encoding the dependent representations, most of them cannot accelerate the encoding process when it comes to parallel encoding. Since most of these approaches use the highest quality representation as the reference encoding, they have to wait until the highest quality representation is completed, resulting in a bottleneck in the parallel encoding scenarios. The overall encoding time of using existing methods is limited by the encoding time of the highest quality representation in parallel encoding. Thus, reducing the time-complexity of the highest quality representations using information from lower quality representations can speed up the parallel multi-rate encoding. Thus, what is needed is an efficient encoding approach that provides an optimized encoding for a given title and that can speed up the parallel multi-rate encoding without significantly impacting the encoding performance.

BRIEF SUMMARY

The present disclosure provides techniques for fast multi-rate encoding for adaptive streaming using machine learning. A method for encoding of video at multiple quality levels may include: encoding a first segment representation at a quality level that is lowest of the multiple quality levels; determining one or more encoding parameters from the encoding of the first segment representation; processing raw data of the video using a neural network to obtain an intermediate output comprising encoding features extracted from the raw data; augmenting the intermediate output with an additional encoding feature to form a final tensor; processing the final tensor with another neural network to obtain a classification output comprising a split or not split decision for an image data block; and encoding a second segment representation at a quality level that is highest of the multiple quality levels based on the classification output.

In some examples, the method also may include: encoding a plurality of segment representations at one or more quality levels between the lowest of the multiple quality levels and the highest of the multiple quality levels; and outputting an encoded video at the multiple quality levels. In some examples, the encoding of the plurality of segments is performed substantially in parallel. In some examples, the encodings are performed using one of a High Efficiency Video Coding (HEVC) or versatile video coding (VVC) reference encoder. In some examples, the first segment representation comprises a lowest time-complexity representation. In some examples, the neural network comprises a convolutional neural network (CNN) classifier. In some examples, the CNN classifier comprises a plurality of convolutional layers and one or more rectified linear units (ReLUs). In some examples, processing raw data of the video using the neural network comprises: receiving as input to a convolutional layer one or more channels, and applying maxpooling to reduce a spatial size of a channel. In some examples, processing raw data of the video using the neural network comprises: extracting a plurality of tensor features from the raw data using a first convolutional layer, and concatenating the plurality of tensor features using an input layer to generate a feature map.

In some examples, the method also includes providing the feature map to a second convolutional layer to generate the intermediate output. In some examples, the second convolutional layer comprises fully connected layers. In some examples, the another neural network comprises fully connected layers. In some examples, one or both of the neural network and the another neural network comprises a softmax layer. In some examples, the intermediate output comprises a 2D vector.

A convolutional neural network may include: a texture complexity classifier comprising: a raw data feature extraction layer configured to receive raw data and to extract a plurality of tensor features; an input layer configured to concatenate the plurality of tensor features; a first set of fully connected layers configured to generate an intermediate output; a softmax layer; and a second set of fully connected layers configured to generate a classification output comprising a split or not split decision for an image data block. In some examples, one or both of the raw data feature extraction layer and the first set of fully connected layers comprises a rectified linear unit (ReLU). In some examples, one or both of the raw data feature extraction layer and the first set of fully connected layers is configured to apply maxpooling to reduce a spatial size of a channel. In some examples, the intermediate output comprises a 2D vector.

SUMMARY

A machine learning based approach for fast multi-rate encoding is disclosed with specific focus on improving parallel encoding performance. According to embodiments, a method first encodes the lowest quality representation using the HEVC reference software and uses its information to speed up the encoding process of the two highest quality representations using a neural network. Layers in the neural network are used as the texture information extractor and an additional feature vector that contains encoding information from the lowest quality representation is concatenated before passing the output of the neural layers to the final fully connected layer. The method achieves significant time savings (41% in average) in parallel encoding scenarios with a slight increase in bitrate and quality degradation.

DETAILED DESCRIPTION OF EMBODIMENTS

The following description describes certain embodiments by way of illustration only. One of ordinary skill in the art will readily recognize from the following description that alternative embodiments of the structures and methods illustrated herein may be employed without departing from the principles described herein. Reference will now be made in detail to several embodiments.

The above and other needs are met by the disclosed methods, a non-transitory computer-readable storage medium storing executable code, and systems for encoding video content. The redundancy that exists between co-located CTUs in different representations is exploited to reduce the encoding complexity. To do so, information of co-located encoded CTUs in highest and lowest qualities are used to limit search process of each CTU. In methods according to this disclosure, searching in higher depths and lower depths CTUs is skipped based on co-located CTUs in highest and lowest quality representations of the content.

Figure 1:
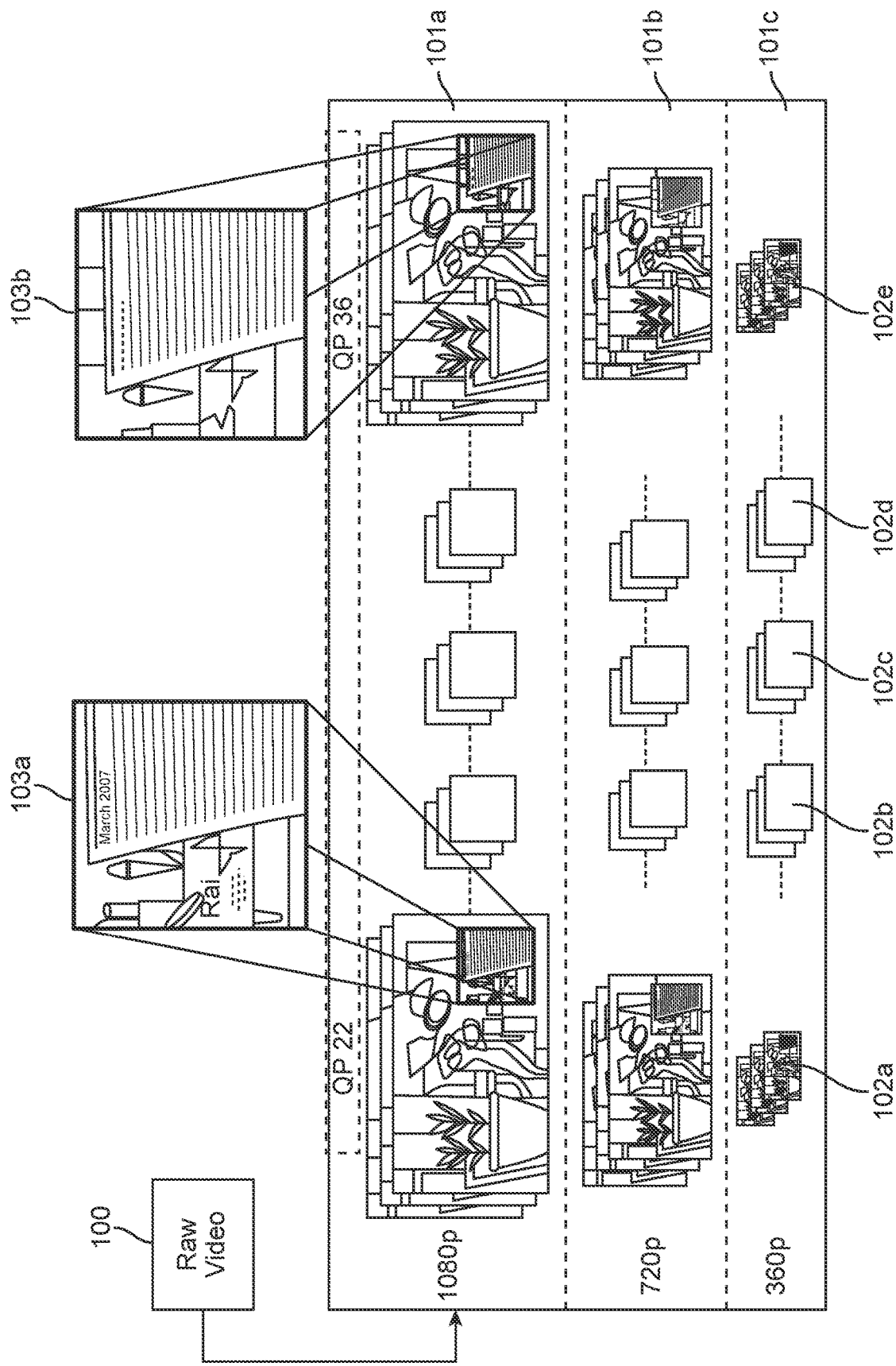
FIG. 1 is a diagram illustrating multiple representations of a video at different encoding rates and qualities.
Figures 2A, 2B:
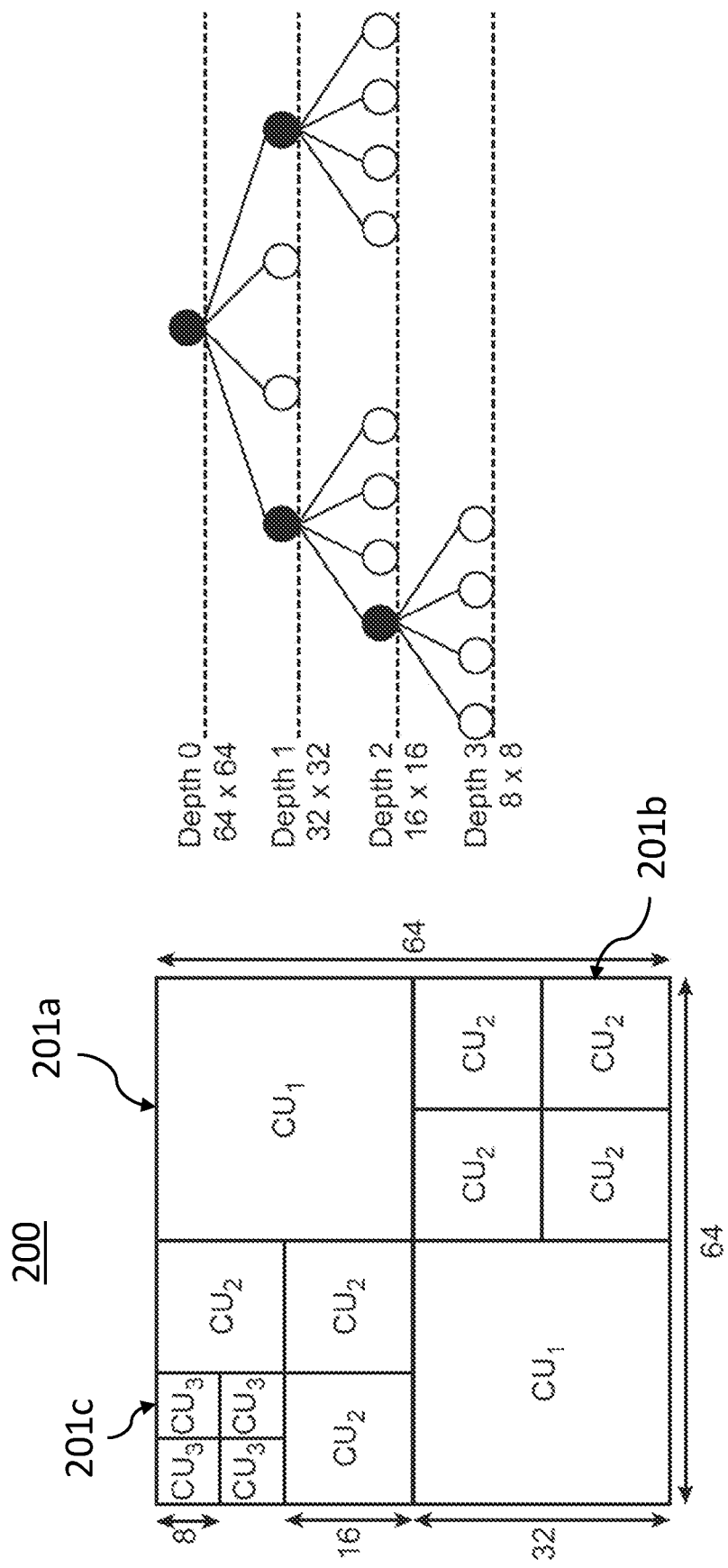
FIG. 2A is a diagram illustrating an HEVC Coding Tree Unit for a frame.
FIG. 2B is a diagram illustrating an HEVC Coding Tree Unit block structure.
Figure 3:
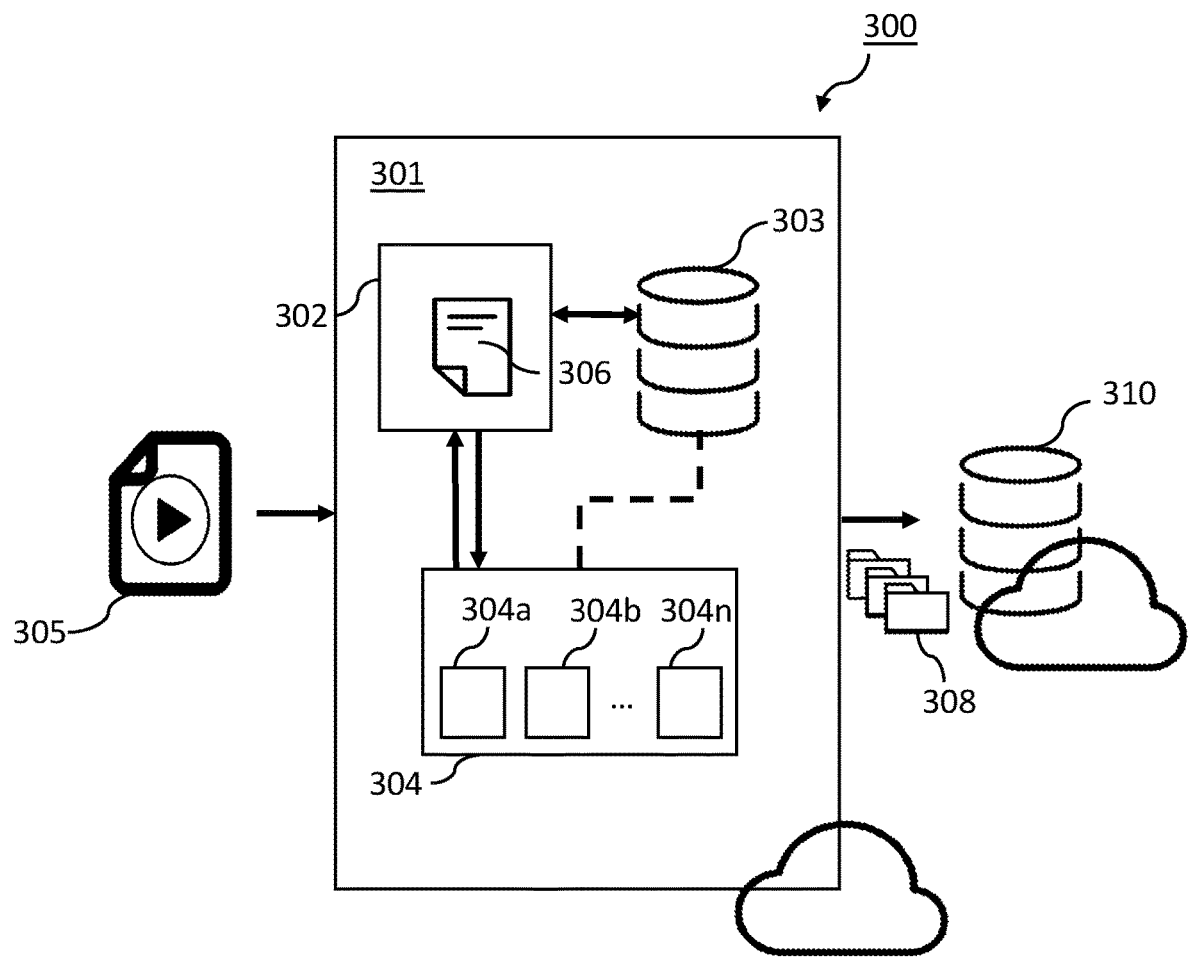
FIG. 3 is a block diagram illustrating an exemplary content encoding system according to embodiments.

Now referring to FIG. 3, a content encoding system is illustrated according to embodiments of the invention. In one embodiment, the encoding system 300 is a cloud-based encoding system available via computer networks, such as the Internet, a virtual private network, or the like. The encoding system 300 and any of its components may be hosted by a third party or kept within the premises of an encoding enterprise, such as a publisher, video streaming service, or the like. The encoding system 300 may be a distributed system but may also be implemented in a single server system, multi-core server system, virtual server system, multi-blade system, data center, or the like. The encoding system 300 and its components may be implemented in hardware and software in any desired combination within the scope of the various embodiments described herein.

According to one embodiment, the encoding system 300 includes an encoder service 301. The encoder service 301 supports various input and output formats (e.g., HTTP, FTP, AWS-S3, GCS, Aspera, Akamai NetStorage, etc.) and multiple codecs (H264, H265, VP9, AV1, AAC, etc.) for encoding video content, for example, for VoD and live streaming applications. It also supports streaming protocols like MPEG-DASH and HLS and may be integrated with Digital Rights Managers (DRMs) like Widevine, Playready, Marlin, PrimeTime, Fairplay, and the like. According to embodiments, the encoder service 301 is a multi-cloud service capable of dynamically scaling with generation of processing nodes to support the workload. In one embodiment, for a particular encoding process, the encoder service 301 can generate an encoder coordinator node 302 supported by a machine learning module 303 and one or more encoder nodes 304.

According to embodiments, encoder nodes 304 can instantiate any number of encoder instances or submodules 304a, 304b, . . . , 304n, each capable of encoding an input video into an encoding format. The encoder node 304 performs the encodings, connecting inputs to outputs, applying codec configurations and filters on the input video files. The encoders can apply different and multiple muxings on streams like MPEG2-TS, fragmented MP4 and progressive MP4 and add DRM to the content and/or encrypted it as needed. Encoder node 304 can also extract and embed captions and subtitles, e.g., 608/708, WebVTT, SRT, etc.

For example, encoding submodule 304a may be an MPEG-DASH encoding submodule for encoding an input video 305 into a set of encoded media 308 according to the ISO/IEC MPEG standard for Dynamic Adaptive Streaming over HTTP (DASH). The encoding submodules 304b-304n may provide encoding of video for any number of formats, including without limitation Microsoft's Smooth Streaming, Adobe's HTTP Dynamic Streaming, and Apple Inc.'s HTTP Live Streaming. In addition, encoding submodules 304b-304n may use any type of codec for video encoding, including, for example, H.264/AVC, H.265/HEVC, H.266/VVC, VP8, VP9, AV1, and others. Any encoding standard or protocol may be supported by the encoder node 304 by providing a suitable encoding submodules with the software and/or hardware required to implement the desired encoding. In addition, in embodiments, encoder node 304 may be distributed in any number of servers in hardware, software, or a combination of the two, networked together and with the encoder coordinator node 302. It should be noted that in simpler implementations, a simple encoder system can include a single encoding node that may be programmed to operate according to any desired standard using the appropriate codec software.

According to one aspect of embodiments of the invention, the encoder node 304 encodes an input video 305 at multiple bitrates with varying resolutions into a resulting encoded media 308. For example, in one embodiment, the encoded media 308 includes a set of fragmented MP4 files encoded according to the H.264 video encoding standard and a media presentation description ("MPD") file according to the MPEG-DASH specification. In an alternative embodiment, the encoding node 304 encodes a single input video 305 into multiple sets of encoded media 308 according to multiple encoding formats, such as MPEG-DASH and HLS for example. Input video 305 may include digital video files or streaming content from a video source, such as a camera, or other content generation system. According to embodiments, the encoder node 304 processes a video file in time-based chunks corresponding to portions of the input video file 305. Encoding submodules 304a-n process the video chunks for a given input video file substantially in parallel, providing a faster encoding process than serially processing the video file 305. The encoder node 304 is capable of generating output encoded in any number of formats as supported by its encoding submodules 304a-n.

According to another aspect of various embodiments, the encoder node 304 encodes the input video based on a given encoder configuration 306. The encoder configuration 306 can be received into the encoding system 301, via files, command line parameters provided by a user, via API calls, HTML commands, or the like. According to one embodiment, the encoder configuration 306 may be generated or modified by the encoder coordinator node 302 and/or the machine learning module 303. The encoder configuration 306 includes parameters for controlling the content generation, including the variation of the segment sizes, bitrates, resolutions, encoding settings, URL, etc. For example, according to one embodiment, the input configuration 306 includes a set of target resolutions desired for encoding a particular input video 305. In one embodiment, the target resolutions are provided as the pixel width desired for each output video and the height is determined automatically by keeping the same aspect ratio as the source. For example, the following pixel-width resolutions may be provided 384, 512, 640, 768, 1024, 1280, 1600, 1920, 2560, 3840. In this embodiment, the encoded output 308 includes one or more sets of corresponding videos encoded in one or more encoding formats for each specified resolution, namely, 384, 512, 640, 768, 1024, 1280, 1600, 1920, 2560, and 3840. In one embodiment, a set of fragmented MP4 files for each resolution is included in the encoded output 308. According to yet another aspect of various embodiments, the encoder configuration 306 is customized for the input video 305 to provide an optimal bitrate for each target resolution.

According to another aspect of various embodiments, the encoded output 308 is then delivered to storage 310. The encoding service 301 can connect to cloud-based storage as an output location to write the output files. The specific location/path may be configured for each specific encoding according to embodiments. For example, in one embodiment, storage 310 includes a content delivery network ("CDN") for making the encoded content 308 available via a network, such as the Internet. The delivery process may include a publication or release procedure, for example, allowing a publisher to check quality of the encoded content 308 before making available to the public. In another embodiment, the encoded output 308 may be delivered to storage 310 and be immediately available for streaming or download, for example, via a website.

According to embodiments, encoding submodules 304a-n are configured to encode a video file 305 using HEVC encoding. The encoding submodules may process the video chunks for a given input video file substantially in parallel, providing a faster encoding process than serially processing the video file 305. In HEVC, the encoding process entails searching for the optimal partition of each Coding Unit Tree (CTU) with the lowest distortion. Encoding submodules 304a-n use information of higher and lower quality encoded versions of the video content to limit the Rate-Distortion Optimization (RDO) for each CTU in the other versions. Given the redundancy inherent in encoding the same video file 305 at different bit-rates, it has been shown that with increasing bit-rate the partitioning of CTUs tend to take higher depths; that is, for co-located CTUs in the video content, e.g., same position of same frame, in the higher bit-rate representation, the CTU is likely to have more partitions or higher depths. Therefore, it is assumed that a CTU at the highest bit-rate will have higher depths compared with the co-located CTUs in the lower bit-rate representations. Based on this assumption, conventional methods use depth of CTUs in the highest bit-rate as a bound to eliminate searching for partitions with larger depths than the co-located CTU in the highest bit-rate. Although this method leads to considerable time-complexity reduction, it is not the most efficient method. This is because: (i) when larger depths are dominant in highest-quality representations, like in those of fast movement video sequences, there is no efficiencies to be gained since all the potential partitions of co-located CTUs will have to be searched to the deepest options, thus the encoder would act as an unmodified video encoder, without gaining in efficiency, and (ii) encoding according to this approach does not result in skipping the lowest depths, which are the largest and consequently the most time-consuming CUs when in fact it may be unnecessary to search these options.

Figure 4:
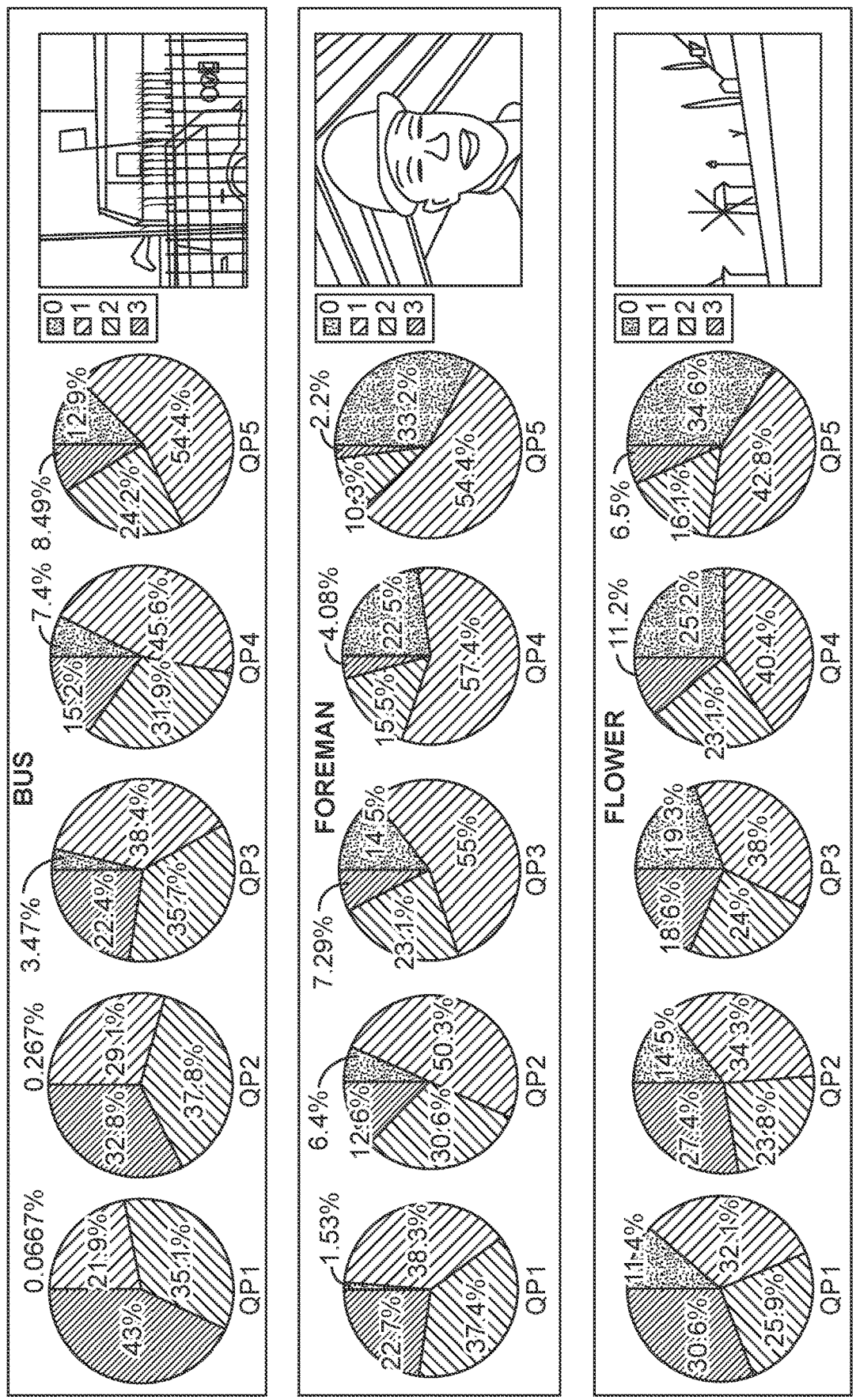
FIG. 4 is a set of charts illustrating percentage of depths of CTU structures at various qualities for three exemplary video sequences according to embodiments.

For example, in FIG. 4, percentage of depths {0,1,2,3} at various qualities {QP1=22, QP2=26, QP3=30, QP4=34, QP5=38} are shown using unmodified HEVC for sequences BUS, FOREMAN, and FLOWER. In the sequence BUS, even in the lower quality representations (QP1 and QP2) there are few depth 0 CUs, less than 1%, as the optimal CU size. Thus, predicting this depth for the optimal cases but skipping for most cases can lead to time-savings. This illustration also shows that, in the highest quality representation, QP5, higher percentage of larger depths, i.e., depths 2 and 3, account for about 75% of the CUs, thus the efficiencies provided by skipping the searching of larger depths are not that significant.

Figure 5:
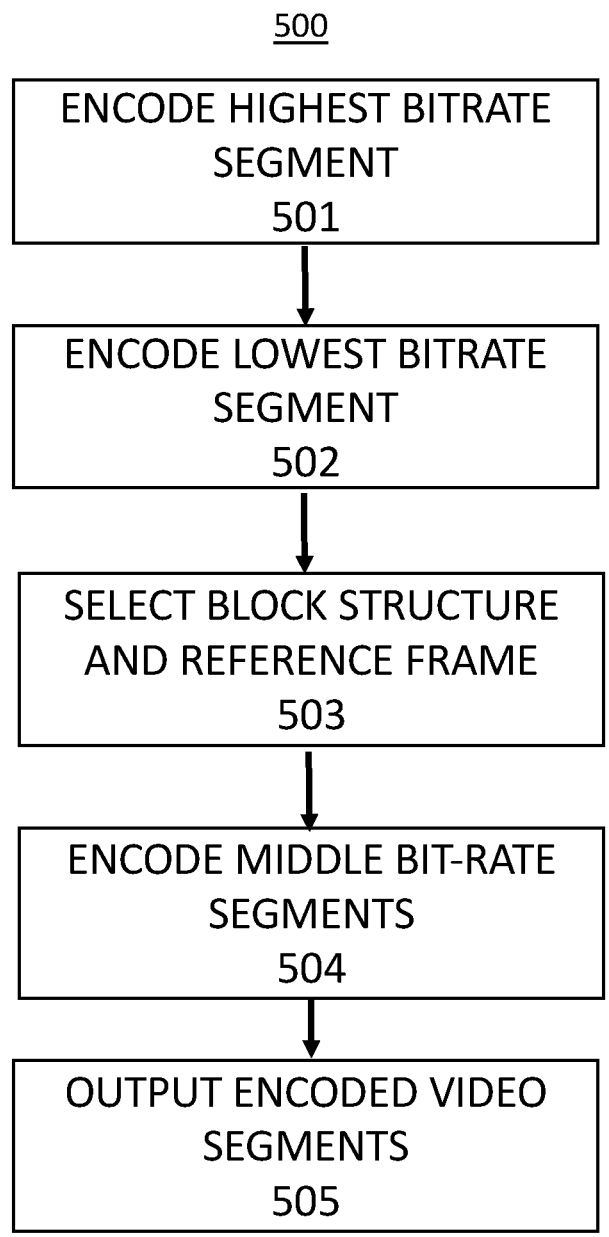
FIG. 5 is a flowchart illustrating an exemplary method for encoding MPEG-DASH video segments at multiple bit-rates using HEVC encoding according to embodiments.

Now referring to FIG. 5, a method for encoding MPEG-DASH video segments at multiple bit-rates using HEVC encoding is provided. The method uses CTUs as an efficient and time complex tool to encode the frames of an input video. The HEVC frames are divided into tiles and further divided into CTUs with pre-determined size of n×n. Each CTU is then divided further into square coding units (CUs). According to one embodiment, for a given video content, the highest bit-rate segment is first encoded 501. Then the lowest bit-rate video segment is encoded 502 using information derived from the highest bit-rate segment. For example, for co-located CTUs in the lowest bitrate segment, the maximum depth of the CTU in the highest bitrate segment is used as an upper bound, skipping the search of those higher depths in the lowest bitrate version. Then, the block structure and reference frame of both highest and lowest bit-rate video segments are selected 503. Having information of both lowest and highest representations can lead to limiting some search processes of CTUs in the middle quality representations. This information can be used for (i) CU structure decision, (ii) PU mode decision, (iii) prediction type, (iv) motion estimation, and (v) reference frame selection. CTUs in the middle bit-rate segments are then encoded 504 using the selected block structure and reference frames to predict and shorten RDO process for encoding each CTU in middle bit-rates. The encoded video segments at the various bit-rates are then output 505. According to embodiments, the method 500 delays just one frame using parallel processing. This approach provides time-complexity reduction compared to the reference software for middle bit-rates while degradation is negligible.

Figure 7A:
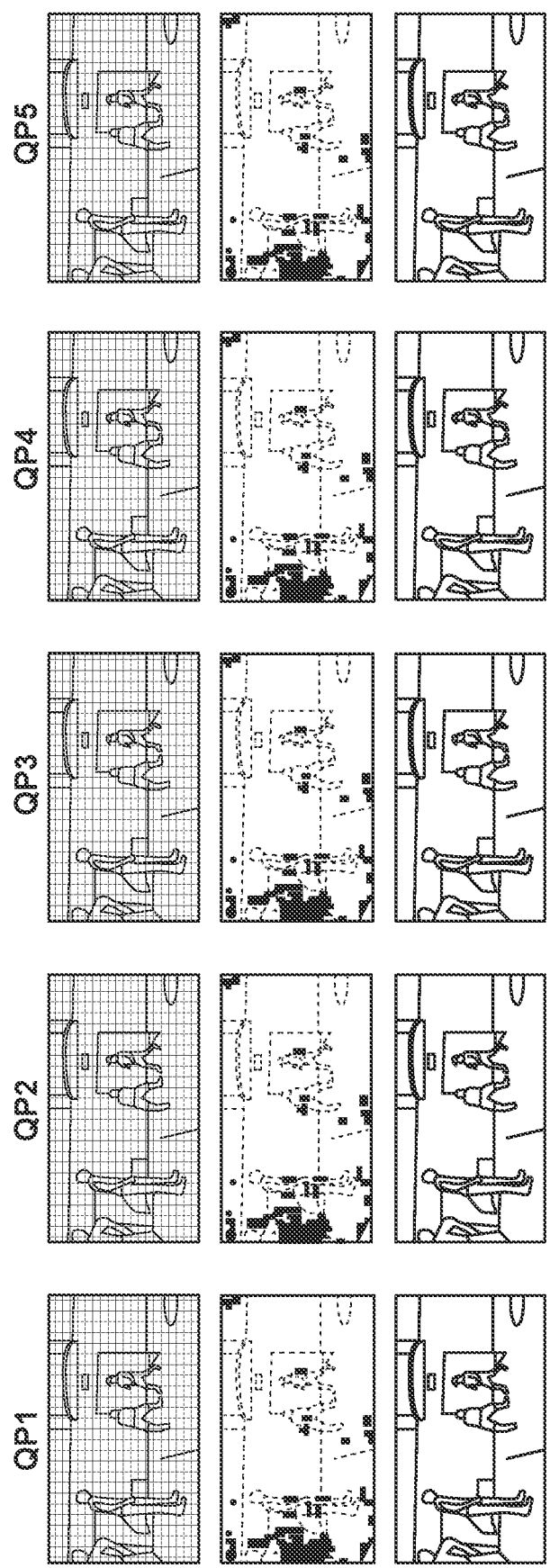
FIG. 7A is a set of images illustrating example block structure, PU mode, motion vectors, and prediction type of one frame of a video sequence in five different-quality representations.

By way of example, FIG. 7A shows block structure, PU mode, motion vectors, and prediction type of one frame in five representations of different qualities, QP1-QP5, for frame 178 of the "Basketball Drive" sequence. As shown, CUs in the middle qualities have depths mostly between lowest and highest qualities. Motion vectors and prediction show similar behavior for all the representations. At least, for the cases that CUs in the highest and lowest qualities have the same information with high probability, co-located CUs in the middle qualities show the same information.

Figure 7B:
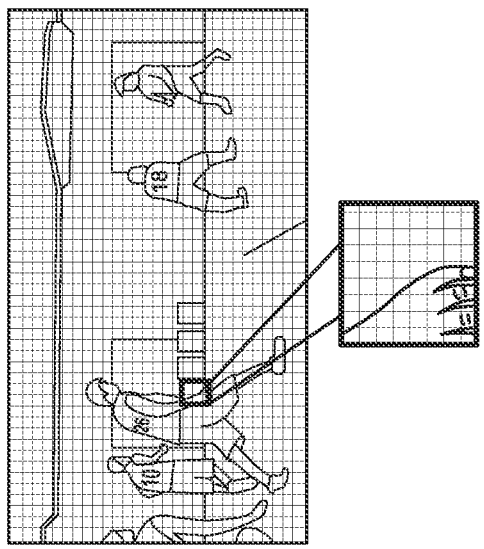
FIG. 7B is a set of images illustrating example coding units in co-located frames of a video in three different encodings.
Figure 7B:
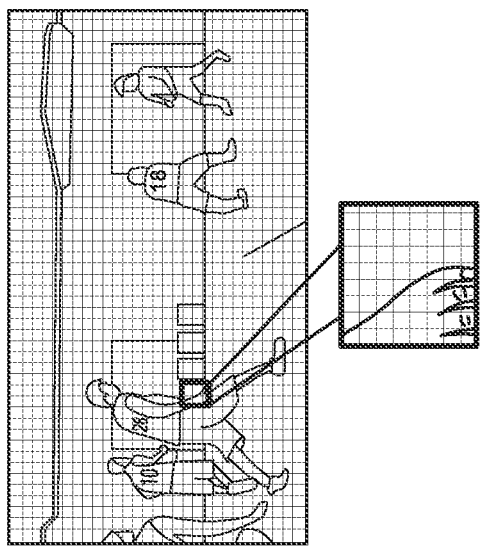
Figure 7B:
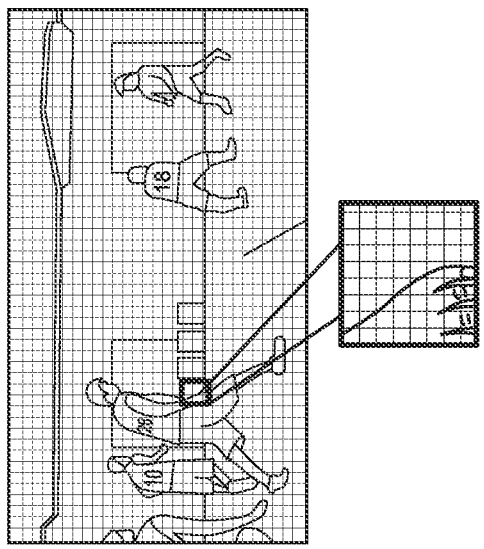

An analysis of the probability of CUs in the middle representations that have depths between highest and lowest qualities shows that such probabilities are high. Smaller depths than the co-located CU in the lowest quality frame and larger depths than the co-located CU in the highest quality frame can be skipped from the searching process with high confidence. FIG. 7B shows an example in which the smallest depth for the optimal CTU structures of the middle QP frames has depths between highest and lowest quality where the larger depth is 2.

Figure 6:
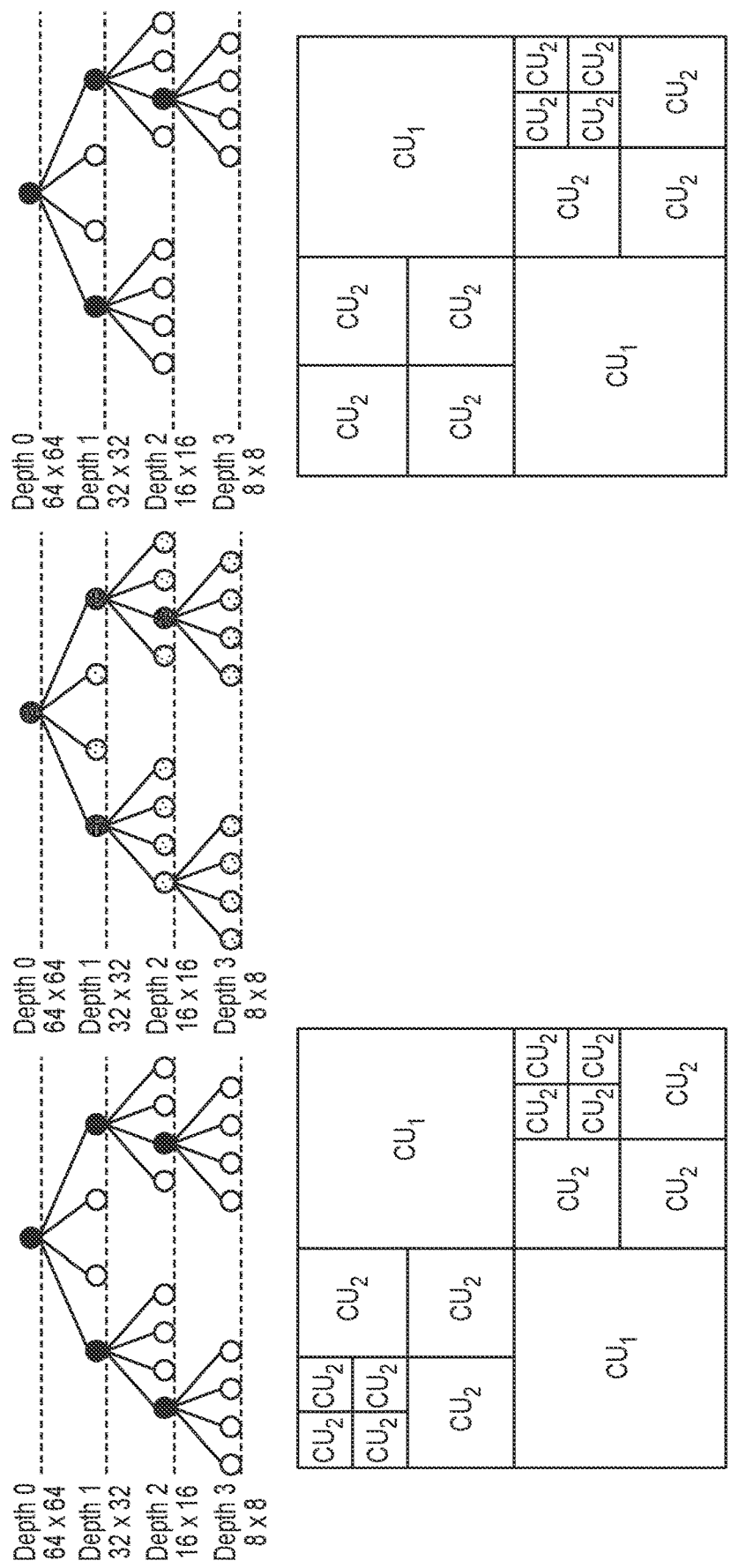
FIG. 6 is an illustration of the application of a method according to embodiments to an exemplary Coding Tree Unit.

As illustrated in FIG. 6, a method according to embodiments of this disclosure provides a depth elimination approach that reduces the complexity of the search process. As illustrated in FIG. 6, red depths are skipped from searching as they have smaller depth than the lowest quality and blue depths stopped from division to larger depth as they have smaller (or equal) depth than the highest quality representation.

Using unmodified HEVC to encode both highest and lowest quality representations increases total encoding time-complexity. To avoid this, the lowest quality representation is encoded based on information from the highest quality representation. As this representation does not have access to lower quality representation, higher bound depth is considered the worst case and just eliminate searching the depths that are smaller than co-located CUs in the highest quality representation.

Recent video encoders like HEVC use multi reference frame motion estimation to improve efficiency at the cost of time-complexity increase. Simulation results show that if co-located CUs in the highest and lowest quality representations select the same reference frame for motion compensations, intermediate representations with high probability will select the same reference frame. This probability have been calculated for the used dataset. Based on this similarity, for the co-located CUs that select the same reference frame in the lowest and highest qualities, current CU in the co-located intermediate representation selects the same reference frame and skips searching other available reference frames.

Figure 8:
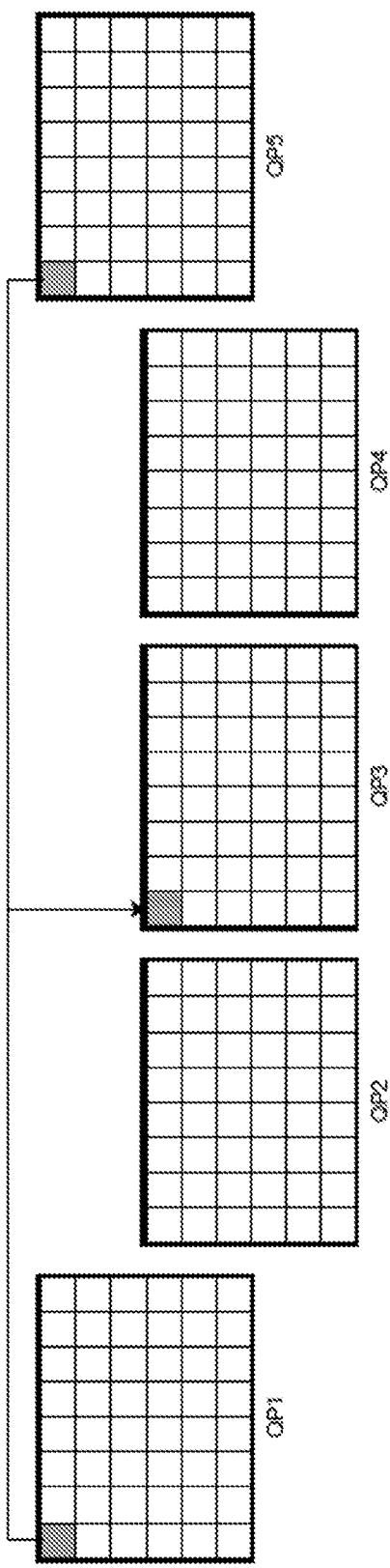
FIG. 8 is a diagram illustrating a parallel encoding approach according to embodiments.

Now referring to FIG. 8, parallel processing is preferable where high computation process like multi-rate encoding is required. Conventional methods that use information of just highest or lowest quality representation to encode the other representations need to encode just reference representation and using its information to encode the other representations in parallel. The methods according to embodiments of this disclosure encode both highest and lowest quality representations and then encode the intermediate representations in parallel which can lead to increase in total time-complexity. However, it should be noted that as one CTU is encoded in both highest and lowest quality representations its information can be used to encode co-located CTUs in the intermediate representations.

In yet other embodiments, the time-complexity of the encoding of the highest quality representations can be further optimized using information from lower quality representations using machine learning implementations. According to these embodiments, neural networks are used to further reduce the complexity of the CTU structure search process. In one embodiment, convolutional neural networks (CNNs) are used to predict the CTU split decision for multi-rate encoding. Since the lowest quality representation has the minimum time-complexity, in some embodiments, it is chosen as the reference encoding representation. Its information along with the information from the raw video can be used by the CNN to predict the CTU split decisions of the higher quality dependent representations to reduce the time-complexity when using parallel encoding.

According to one embodiment, the CTU partitioning determination is modeled as a machine learning binary classification problem for each depth level and a leveled structure is provided as a solution. In this embodiment, the neural network features of input tensors that are best suited for the depth decision are determined. For example, in one embodiment, the same network structures to be used for the classification process may be trained with different feature sets and the results can be compared to select the best suited features. For example, in one embodiment, RD cost, the variance of pixel values, motion vectors, the depth value of the co-located CTU, QP, and PU split decision of the co-located CTU may be selected as features of the input tensors for a particular neural network implementation. It should be noted, that with different neural networks, the optimal set of features may vary and the specific feature set is not a limiting aspect of the disclosed approach.

For example, in one embodiment, the variance of the pixel values of the corresponding CU in the raw video can be calculated for each CU. For the QP, frame level QP can be used as a feature. For RD cost, the number of bits required to encode the co-located CTU and its four sub-CUs in the reference encoding can be used as a feature of the input tensor. PU split decision feature can be a binary value, for example, 1 if the given CU is further partitioned or 0 otherwise. The depth value can also be provided as a binary feature, for example, a value of 1 if the co-located CU in the reference representation is split or 0 otherwise. Finally, for motion vectors, the average of magnitude of motion vectors inside the co-located CTU in the reference encoding can be provided as a feature value.

According to embodiments, features derived from HEVC encoded videos are used as training videos to train the neural networks. For example, in one embodiment, 12 common test sequences defined in F. Bossen et al., "Common test conditions and software reference configurations," JCTVC-L1100, vol. 12, p. 7, 2013, incorporated herein by reference, may be used as training videos. The information at CTU level may be extracted according to a classifier level, for example, information of 64×64 pixel blocks is extracted for depth 0 classifier and information of 32×32 pixel blocks for depth 1 classifier. As further described below, the classifier approach disclosed herein may be used on a per-CTU level for any number of levels. Further, information of Luma (Y) and Chroma (U and V) channels may be extracted from the raw video to generate the training tensor features as described above. Once the training tensor features are extracted, they are stored and used for training each neural network classifier, for example, a CNN classifier.

Moreover, each of these video sequences may be encoded with an HEVC encoder, such as for example the HEVC reference software (HM 16.21) as described in G. J. Sullivan, J. R. Ohm, W. J. Han, and T. Wiegand, "Overview of the high efficiency video coding (HEVC) standard," IEEE Transactions on circuits and systems for video technology, vol. 22, no. 12, pp. 1649-1668, 2012, incorporated herein by reference. For example, the training videos may be encoded using reference quality parameters, e.g., QP38, to obtain encoding feature information, such as RD cost, motion vectors, CTU depth level, PU split decision, and QP. All of these features are normalized globally before feeding them to the CNN. The depth values may be stored in vectors with five elements. For example, in one embodiment the first element of the vector is the split decision for the Depth 0 CTU, i.e., 1 if it is split, 0 if it is not. The following four elements are split decisions for four Depth 1 CUs in the order of top-left, top-right, bottom-left, and bottom-right. As one of ordinary skill in the art will realize, the order of elements in the vector may be varied without departing from the teachings of the disclosure.

In order to train the CNNs, the frames of the training videos may be divided into training and validation sets, for example with 90% training and 10% validation ratio but any other division may be used. For example, in an HEVC embodiment a total of 259200 CTUs can be used for training and 28800 CTUs for validation. Note that the Y, U, and V channels of the CTUs can be used separately for training.

Figure 9:
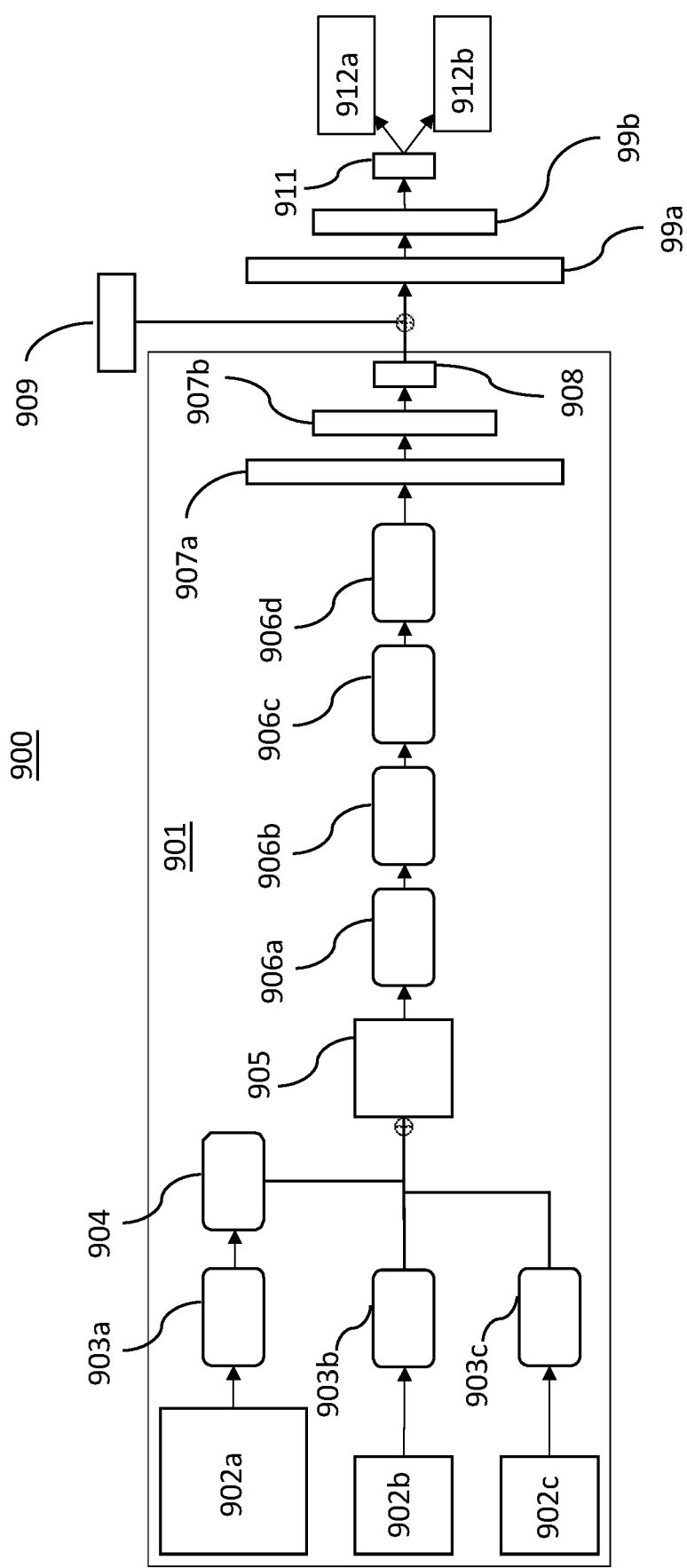
FIG. 9 is a diagram illustrating a neural network architecture for a classifier according to embodiments.

Now referring to FIG. 9, a block diagram illustrating a network architecture for an exemplary HEVC depth 0 classifier 900 is provided according to embodiments. In this example, a CNN is used as the depth split decision classifier, however, in other embodiments different neural networks may be used. According to one embodiment, a texture processing CNN 901 generates an intermediate output tensor that is augmented before a final processing stage to produce a classifier result 912a-b (e.g., probability split or non-split). In the texture processing stage 901, an input layer 902a-902c is provided to receive as input Luma or Chroma channel (Y, U, or V) feature tensors. For example, raw Y, U, and V values of the corresponding CTU may be given as input to the CNN input layer 902. Layer 902a may comprise a CNN layer for a single channel at a 64×64 pixel (width and height) block. This layer can accept raw data from the Luma Y channel as input. Layers 902b and 902c also may be CNN layers, for example each for a single channel and for a 32×32 pixel block, configured to receive raw data from Chroma U and V channels as input. Layer 902a feeds into a sequence of convolutional layers 903a and 904, both with a Rectified linear unit (ReLU) as the activation function at the end of the layers, as for example described in X. Glorot, A. Bordes, and Y. Bengio, "Deep sparse rectifier neural networks," in Proceedings of the fourteenth international conference on artificial intelligence and statistics, 2011, pp. 315-323, incorporated herein by reference. In these layers MaxPooling may be applied to reduce the spatial size. Layer 903a is a 4 channel at 32×32 pixel CNN layer that feeds into layer 904, an 8 channel at 32×32 pixel CNN layer. The Y channel data is fed to a convolutional layer 902a and MaxPooling may be applied to reduce the spatial size of Y channel by half, to match the sizes of U and V channels. Another convolutional layer 903a may follow to increase the number of feature maps. Simultaneously, U and V channels are fed into a single convolutional layer 902b and 902c to extract features and are fed into CNN layers 903b and 903c, which are similar to layer 903a, 4 channel at 32×32 pixels each. Feature maps from these parts of the network are concatenated together and fed into the main texture processing part of the CNN.

In this embodiment, the network may be designed with a structure similar to the one described in K. Kim and W. W. Ro, "Fast CU Depth Decision for HEVC Using Neural Networks," IEEE Transactions on Circuits and Systems for Video Technology, vol. 29, no. 5, pp. 1462-1473, 2019, incorporated herein by reference. As illustrated in FIG. 9, in this embodiment the output of the three raw data feature extraction layers (e.g., one or more of layers 903a-c and 904) is input into an input layer 905, a 16 channel layer with 32×32 pixels, where each of the output vectors from layers 904, 903b, and 903c are concatenated. This concatenated input is processed through a 4-layer CNN with layers 906a, a 32 channel layer with 16×16 pixels, followed by layer 906b, a 64 channel layer with 8×8 pixels, then layer 906c, a 128 channel layer with 4×4 pixels, and layer 906d, a 256 channel layer with 2×2 pixels. Similar to layers 903 and 904, all these CNN layers 906 may include ReLu activation and MaxPooling to reduce the spacial size, from 16×16 to 2×2. Then, instead of appending a feature vector at the end of the output of the convolution layers 906a-d, the output of the convolution layers 906a-d is first passed to fully connected layers 907a and 907b, with output sizes 256 and 64 respectively, to get a 2D vector output and apply a softmax layer 908 at the end. Thus, this part of the network may be used as the texture complexity classifier. A 2D vector is obtained as the intermediate output using this softmax activation layer 908. In some examples, this 2D vector (e.g., a final tensor) may be processed through layers 99a-b (e.g., another set of fully connected layers) with input feature vector 909. In some examples, another softmax activation layer 911 also may be applied to generate classifier result 912a-b. The output 912a-b can be interpreted as the probability that the given texture information belongs to class split or non-split.

For illustrative purposes, a network structure for an HEVC depth 0 classifier is shown in FIG. 9. A similar HEVC depth 1 classifier would almost the same structure with minor modifications due to the variance in the input size, i.e., the last convolution layer can be removed and all the convolutional feature map sizes are halved. In general, a similar classifier can be adapted to other encoding standards and different depth levels by modifying the appropriate sizes. That is, the Y, U, and V input sizes and intermediate channel sizes can be adjusted depending on the depth level and CTU sizes of the given standard. For example, for an HEVC depth 1 classifier, each of the sizes are halved and for a depth 0 VVC classifier the sizes can be doubled.

According to an illustrative embodiment, batch normalization, as for example described in S. Ioffe and C. Szegedy, "Batch normalization: Accelerating deep network training by reducing internal covariate shift," arXiv preprint arXiv: 1502.03167, 2015 (incorporated herein by reference), can be applied and dropout, as for example described in [14] N. Srivastava, G. Hinton, A. Krizhevsky, I. Sutskever, and R. Salakhut-dinov, "Dropout: A Simple Way to Prevent Neural Networks from Overfitting," Journal of Machine Learning Research, vol. 15, no. 56, pp. 1929-1958, 2014 (incorporated herein by reference), may be used to regulate the network. As noted above, rectified linear unit (ReLU) can be used as the activation function at the end of every layer but in other embodiments different activation functions may be used. In embodiments, stochastic optimization, as for example described in D. P. Kingma and J. Ba, "Adam: A method for stochastic optimization," arXiv preprint arXiv: 1412.6980, 2014 (incorporated herein by reference), may be optionally used as optimizer with learning rate of, for example, 10-4.

According to embodiments, using a classifier approach as described with reference to FIG. 9, separate networks can be trained for any number of levels of any of the representations of a given video content and after training, the classifiers can be used during the encoding phase to optimize the time-complexity of the overall encoding process. For example, in an illustrative HEVC embodiment, a three-classifier approach can be used: two classifiers are trained and used for encoding the highest quality representation (e.g., QP22), applying them for depth levels 0 and 1 classification, and one classifier for the second highest quality representation (e.g., QP26) for depth level 0 classification. It should be noted that the representations and depth levels to which the ML classifiers are applied depend on the relative time-complexity optimization that may be obtained and output bitrate desired. For example, in the HEVC embodiment above, a depth 1 classifier for the QP26 representation may be omitted because it leads to an unnecessary bitrate increase. Similarly, using this approach does not require application of the ML classification to encode all the representations. For example, in the HEVC illustrative implementation described above, other lower quality representations, i.e., QP30 and QP34, do not require ML classification since their encoding time-complexity with HEVC reference software is already at an acceptable level in terms of parallel encoding and, thus, using the CNN will introduce unnecessary bitrate increase.

Figure 10:
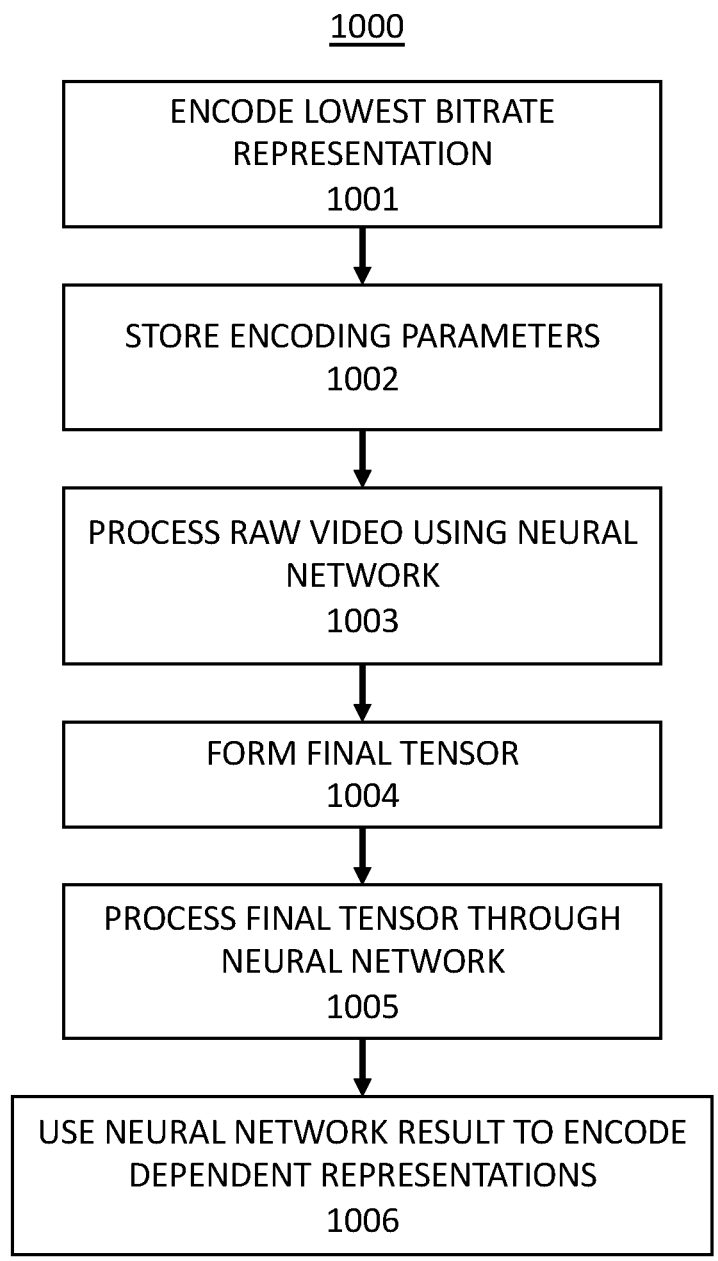
FIG. 10 is a flow diagram illustrating an encoding approach according to embodiments.

Now referring to FIG. 10, a flow chart illustrating a method 1000 of encoding according to embodiments of this disclosure is provided. The encoding method 1000 begins by encoding a lowest quality or bitrate representation 1001 using a standard encoder, such as for example and HEVC or VVC reference encoder. The lowest quality representation should be the fastest or lowest time-complexity representation to encode in a set of representations. Starting with the representation enables the start of optimized parallel processing of other representations faster than approaches that leverage information from encoding the highest quality representation first. During this encoding, one or more encoding parameters useful for encoding other representations are derived and stored 1002 to be used to speed up the encoding of the remaining representations.

Then, the raw video is processed using a neural network 1003. For example, a CNN classifier may be used to process Y, U, and V channels of the raw video to obtain an output of an intermediate softmax layer. Then, an additional feature vector is appended to the output to form a final tensor 1004. The final tensor is processed 1005 through a neural network classifier, such for example, a set of fully connected layers to obtain the final split decision. The split decision of the neural network is then used 1006 to speed up the encoding process of other representations. For example, the two most complex HEVC representations can be processed based on the CNN classifier split decisions some of its CTUs. As noted above, for example, a CNN classifier output can be used to determine CU split decisions for depth 0 and depth 1 for the highest quality (e.g., QP22) representation and for depth 0 split decision for the next highest (e.g., QP26) representation. The remaining representations can be encoded in parallel as before or can be encoded after the highest quality representation is encoded using the optimization approach described with reference to FIG. 5.

According to an exemplary embodiment, eight sequences from different datasets were used to evaluate the performance of the CNN classifier approach described above. The datasets used are described in L. Haglund, "The SVT high definition multi format test set," Swedish Television Stockholm, 2006 and K. Suehring and X. Li, "JVET common test conditions and software reference configurations," JVET-B1010, 2016, both incorporated herein by reference.

All sequences were encoded at five QP levels {22, 26, 30, 34, 38} to obtain representations of different qualities. Bjontegaard delta rates using PSNR and VMAF are used as metrics for evaluation as for example described in G. Bjontegaard, "Calculation of average PSNR differences between RD-curves," VCEG-M33, 2001 and Z. Li, A. Aaron, I. Katsavounidis, A. Moorthy, and M. Manohara, "Toward a practical perceptual video quality metric," [Online] https://netflixtechblog.com/toward-a-practical-perceptual-video-quality-metric-653f208b9652, 2016, accessed: 2020 May 29 (incorporated herein by reference). $BDR_{p/v}/\Delta T$ was also used to capture the effect in terms of both the time and size complexity.

The Pytorch framework, as for example described in A. Paszke, S. Gross, F. Massa, A. Lerer, J. Bradbury, G.

Chanan, T. Killeen, Z. Lin, N. Gimelshein, L. Antiga et al., "PyTorch: An imperative style, high-performance deep learning library," in Advances in Neural Information Processing Systems, 2019, pp. 8024-8035 (incorporated herein by reference), was used running on an Intel Xeon Gold 5218 @ 2.30 GHz and NVIDIA Quadro GV100 with 384 GB memory and Ubuntu Linux 18.04.

Using this exemplary implementation, the neural network obtained 0.79, 0.81, and 0.77 ROC-AUC scores, as for example described in J. A. Hanley and B. J. McNeil, "The meaning and use of the area under a receiver operating characteristic (ROC) curve." Radiology, vol. 143, no. 1, pp. 29-36, 1982 (incorporated herein by reference), for depth 0 classification for QP22 and QP26, and depth 1 classification for QP22 respectively.

Unmodified HEVC reference software (referenced as "HM 16.21" or "HM" in this experiment), the Lower Bound approach, and the CNN classifier approach of this disclosure (referenced as "FaME-ML" in this experiment) were used to compare the performance. The Lower Bound approach is a modified version of the approach described in H. Amirpour, E. Çetinkaya, C. Timmerer, and M. Ghanbari, "Fast Multi-Rate Encoding for Adaptive HTTP Streaming," in 2020 Data Compression Conference (DCC). IEEE, 2020, pp. 358-358 (incorporated herein by reference) in which the upper bound for CTU depth searches is removed. The lowest quality representation was used as the reference encoding and the CU depth searches for the remaining representations were bounded by the depth level of the co-located CU in the reference representation, i.e., depth levels that are lower than the co-located CU were not searched.

Figure 11:
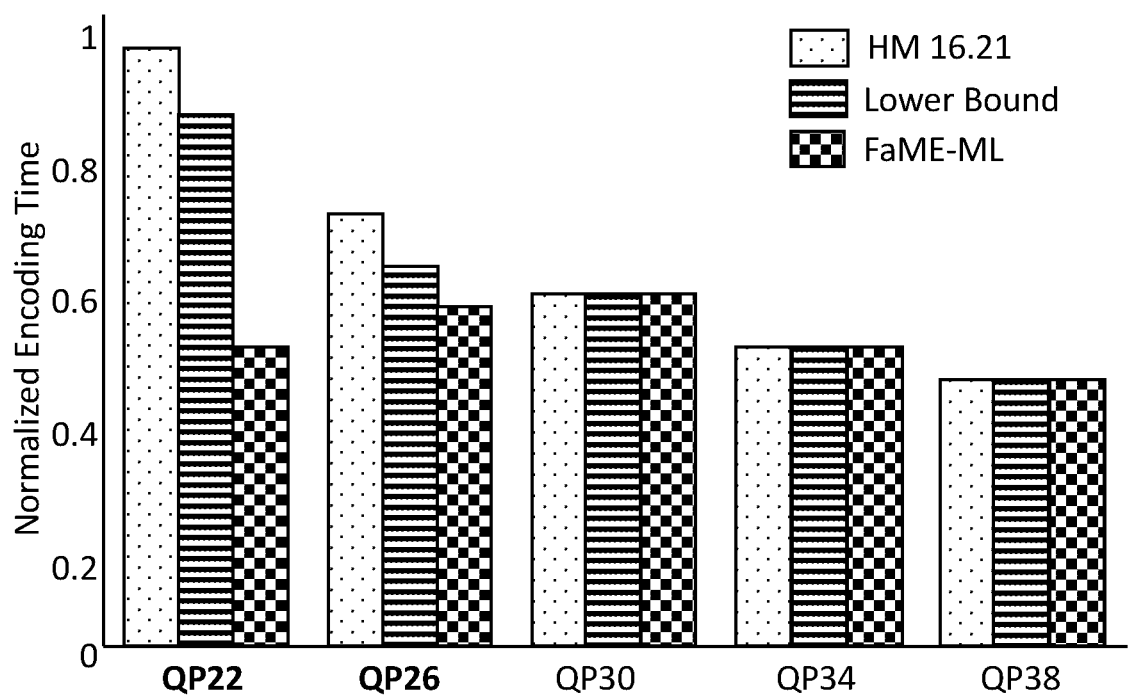
FIG. 11 is a bar graph illustrating comparative performances of existing encoding approaches versus the approach according to embodiments.

The normalized average time-complexities of the test sequences in all QP levels using aforementioned methods are shown in FIG. 11. Note that aforementioned methods in this comparative implementation were only applied to representations with $QP_{22}$ and $QP_{26}$. Thus, the remaining representations have the same time-complexity as the unmodified HEVC. The results are normalized using the min-max normalization.

It can be seen that the FaME-ML of the present disclosure achieves significant time saving for the highest quality representations, i.e., around 49% for $QP_{22}$ and 23.6% for $QP_{26}$, respectively. FaME-ML achieves around 41% reduction in overall time-complexity compared to HM in terms of parallel encoding. Since these encoding are done in parallel, the time-complexity for methods are bounded by their highest time-complexities. Note that FaME-ML does not need to wait for $QP_{38}$ to be fully encoded first since the encoding of remaining representations can start when the first CTU is encoded in the $QP_{38}$. In some examples, the encoding time-complexity of different representations using FaME-ML may be close to each other, i.e., none of them will be a significant bottleneck in the parallel encoding.

BD-Rate (BDR) results using both PSNR ($BDR_P$) and VMAF ($BDR_V$) metrics for the test sequences are shown in Table 1:

TABLE 1

| | Lower Bound | | | | | FaME-ML | | | | |
|---|---|---|---|---|---|---|---|---|---|---|
| Sequence | ΔT | $BDR_P$ | $BDR_P$/ΔT | $BDR_V$ | $BDR_V$/ΔT | ΔT | $BDR_P$ | $BDR_P$/ΔT | $BDR_V$ | $BDR_V$/ΔT |
| DucksTakeOff | 9.84% | 0.346% | 3.51 | 0.092% | 0.93 | 36.42% | 0.305% | 0.84 | 0.119% | 0.32 |
| InToTree | 3.11% | 0.368% | 11.83 | 0.688% | 22.12 | 54.59% | 1.325% | 2.42 | 0.511% | 0.93 |
| OldTownCross | 4.17% | 0.457% | 10.95 | 0.191% | 4.58 | 52.89% | 0.955% | 1.80 | 0.077% | 0.14 |
| ParkJoy | 21.23% | 0.404% | 1.90 | 0.083% | 0.39 | 36.04% | 0.920% | 2.55 | 0.250% | 0.69 |
| RedKayak | 12.72% | 0.764% | 6.01 | 0.282% | 2.21 | 22.98% | 0.525% | 2.28 | 0.184% | 0.81 |
| RushFieldCuts | 17.90% | 0.471% | 2.63 | 0.101% | 0.56 | 40.60% | 1.214% | 2.99 | 0.456% | 1.12 |
| ControlledBurn | 2.30% | 0.703% | 30.56 | 0.146% | 6.34 | 46.91% | 0.679% | 1.47 | 0.493% | 1.05 |
| ParkRunning3 | 16.81% | 0.475% | 2.82 | 0.086% | 0.51 | 39.67% | 1.178% | 2.97 | 0.507% | 1.27 |
| Average | 11.01% | 0.498% | 8.77 | 0.208% | 4.70 | 41.26% | 0.887% | 2.16 | 0.324% | 0.79 |

In Table 1, ΔT represents the difference between the maximum time-complexity of each method compared to the maximum time-complexity of the reference software. The average BD-PSNR/BD-VMAF values are −0.0152/−0.0283 and −0.0243/−0.0393 for the Lower Bound approach and FaME-ML, respectively. It should be noted that all metrics in Table 1 are calculated over all five QP levels.

Moreover, the bitrate increase and quality distortion introduced by FaME-ML is acceptable. In particular, the BDR increase for VMAF is lower compared to BDR increase for PSNR. This is a satisfactory result since VMAF is known for its ability to better predict the human perception compared to other objective metrics such as PSNR.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

We claim:

1. A method for encoding of video at multiple quality levels comprising:
   encoding a first segment representation at a quality level that is lowest of the multiple quality levels;
   determining one or more encoding parameters from the encoding of the first segment representation;
   processing raw data of the video using a neural network to obtain an intermediate output comprising encoding features extracted from the raw data;
   augmenting the intermediate output with an additional encoding feature to form a final tensor;
   processing the final tensor with another neural network to obtain a classification output comprising a split or not split decision for an image data block; and
   encoding a second segment representation at a quality level that is highest of the multiple quality levels based on the classification output.

2. The method of claim 1, further comprising:
   encoding a plurality of segment representations at one or more quality levels between the lowest of the multiple quality levels and the highest of the multiple quality levels; and
   outputting an encoded video at the multiple quality levels.

3. The method of claim 1, wherein the encoding of the plurality of segments is performed in parallel.

4. The method of claim 1, wherein the encodings are performed using one of a High Efficiency Video Coding (HEVC) or versatile video coding (VVC) reference encoder.

5. The method of claim 1, wherein the first segment representation comprises a lowest time-complexity representation.

6. The method of claim 1, wherein the neural network comprises a convolutional neural network (CNN) classifier.

7. The method of claim 6, wherein the CNN classifier comprises a plurality of convolutional layers and one or more rectified linear units (ReLUs).

8. The method of claim 1, wherein processing raw data of the video using the neural network comprises:
   receiving as input to a convolutional layer one or more channels, and
   applying maxpooling to reduce a spatial size of a channel.

9. The method of claim 1, wherein processing raw data of the video using the neural network comprises:
   extracting a plurality of tensor features from the raw data using a first convolutional layer,
   concatenating the plurality of tensor features using an input layer to generate a feature map.

10. The method of claim 9, further comprising providing the feature map to a second convolutional layer to generate the intermediate output.

11. The method of claim 10, wherein the second convolutional layer comprises fully connected layers.

12. The method of claim 1, wherein the another neural network comprises fully connected layers.

13. The method of claim 1, wherein one or both of the neural network and the another neural network comprises a softmax layer.

14. The method of claim 1, wherein the intermediate output comprises a 2D vector.

15. A convolutional neural network implemented by instructions stored in a non-transitory computer-readable storage medium, comprising:
   a texture complexity classifier comprising:
      a raw data feature extraction layer configured to extract raw data and a plurality of tensor features, wherein the raw data comprises data associated with one or both of Luma and Chroma channels corresponding to a CTU block;
      an input layer configured to concatenate the plurality of tensor features;
      a first set of fully connected layers configured to generate an intermediate output;
      a softmax layer; and
      a second set of fully connected layers configured to generate a classification output comprising a split or not split decision associated with the CTU block, the second set of fully connected layers configured to receive an input feature vector.

16. The convolutional neural network of claim 15, wherein one or both of the raw data feature extraction layer and the first set of fully connected layers comprises a rectified linear unit (ReLU).

17. The convolutional neural network of claim 15, wherein one or both of the raw data feature extraction layer and the first set of fully connected layers is configured to apply maxpooling to reduce a spatial size of a channel.

18. The convolutional neural network of claim 15, wherein the intermediate output comprises a 2D vector.

19. The convolutional neural network of claim 15, wherein the data associated with one or both of Luma and Chroma channels comprises one, or a combination, of a Y value, a U value, and a V value.

20. The convolutional neural network of claim 15, wherein the CTU block comprises one or both of a 64×64 pixel block and a 32×32 pixel block.

* * * * *